US012681636B2

(12) United States Patent
Charon

(10) Patent No.: US 12,681,636 B2
(45) Date of Patent: Jul. 14, 2026

(54) METHOD AND DEVICE FOR CONTROLLING A TOUCH SCREEN

(71) Applicant: Continental Automotive Technologies GmbH, Hannover (DE)

(72) Inventor: Vincent Charon, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 19/103,725

(22) PCT Filed: Aug. 9, 2023

(86) PCT No.: PCT/EP2023/072016
    § 371 (c)(1),
    (2) Date: Feb. 13, 2025

(87) PCT Pub. No.: WO2024/041887
    PCT Pub. Date: Feb. 29, 2024

(65) Prior Publication Data
    US 2026/0056655 A1     Feb. 26, 2026

(30) Foreign Application Priority Data
    Aug. 25, 2022    (FR) ...................................... 2208516

(51) Int. Cl.
    *G06F 3/04886*        (2022.01)
    *G06F 3/041*          (2006.01)
    (Continued)

(52) U.S. Cl.
    CPC ........ *G06F 3/04886* (2013.01); *G06F 3/0412* (2013.01); *G06F 3/04186* (2019.05); *G06F 3/0446* (2019.05); *G06F 3/04842* (2013.01)

(58) Field of Classification Search
    CPC .............. G06F 3/04886; G06F 3/0412; G06F 3/04186; G06F 3/0446; G06F 3/04842
    See application file for complete search history.

(56) References Cited

U.S. PATENT DOCUMENTS

| | | | | |
|---|---|---|---|---|
| 5,594,471 A | * | 1/1997 | Deeran | ............... G06F 3/04886 |
| | | | | 345/173 |
| 9,612,743 B2 | * | 4/2017 | Grossman | ........... G06F 3/04886 |

(Continued)

FOREIGN PATENT DOCUMENTS

| | | | |
|---|---|---|---|
| CN | 109857316 A | * | 6/2019 |
| EP | 0575146 A2 | | 12/1993 |

(Continued)

OTHER PUBLICATIONS

Okuma et al., translation of JP 5211021 (Year: 2013).*

(Continued)

*Primary Examiner* — Dmitriy Bolotin
(74) *Attorney, Agent, or Firm* — Buchanan Ingersoll & Rooney PC

(57)     ABSTRACT

A method for controlling a touch screen including a display adapted to display at least one graphical interface element with a first graphical resolution, and a touch surface including a plurality of detection areas forming a detection grid whose touch resolution is lower than the first resolution. The method being such that it includes steps of determining a display position of a graphical interface element on the display such that the number of detection areas covered by the graphical interface element is minimal, displaying the graphical interface element at the determined position and triggering a function associated with the graphical interface element when a contact is detected in a detection area (Continued)

covered by the graphical interface element. Other aspects relate to a device for performing such a method and a touch screen including the device.

7 Claims, 8 Drawing Sheets

(51) Int. Cl.
   G06F 3/044 (2006.01)
   G06F 3/04842 (2022.01)

(56) References Cited

U.S. PATENT DOCUMENTS

| | | | | |
|---|---|---|---|---|
| 9,665,206 | B1* | 5/2017 | Missig | G06F 3/0441 |
| 11,592,933 | B1* | 2/2023 | Ozbas | H10K 59/40 |
| 12,493,219 | B2* | 12/2025 | Koide | G06F 3/0443 |
| 2007/0033522 | A1* | 2/2007 | Lin | G06F 9/451 |
| | | | | 345/698 |
| 2007/0266335 | A1* | 11/2007 | Zielinski | G06F 9/44505 |
| | | | | 715/761 |
| 2008/0165143 | A1* | 7/2008 | Tolmasky | G06F 3/04842 |
| | | | | 345/173 |
| 2011/0279408 | A1* | 11/2011 | Urano | G06F 3/0446 |
| | | | | 345/173 |
| 2012/0068948 | A1* | 3/2012 | Tomoda | G06F 3/04886 |
| | | | | 345/173 |
| 2012/0084691 | A1* | 4/2012 | Yun | G06F 3/044 |
| | | | | 715/781 |
| 2012/0092355 | A1* | 4/2012 | Yamamoto | G06F 3/04883 |
| | | | | 345/522 |
| 2013/0038556 | A1* | 2/2013 | Nakai | G06F 3/044 |
| | | | | 345/173 |
| 2013/0057493 | A1* | 3/2013 | Hwang | G06F 3/0418 |
| | | | | 345/173 |
| 2013/0120278 | A1* | 5/2013 | Cantrell | G06F 3/04886 |
| | | | | 345/173 |
| 2013/0139094 | A1* | 5/2013 | Lu | G06F 3/0233 |
| | | | | 715/773 |
| 2013/0249950 | A1* | 9/2013 | Mahmoud | G06F 3/0416 |
| | | | | 345/173 |
| 2014/0055495 | A1* | 2/2014 | Kim | G06F 3/14 |
| | | | | 345/660 |
| 2014/0082934 | A1* | 3/2014 | Cok | G06F 3/0443 |
| | | | | 29/825 |
| 2014/0085216 | A1* | 3/2014 | Cok | G06F 3/044 |
| | | | | 345/173 |
| 2015/0153897 | A1* | 6/2015 | Huang | G06F 3/0418 |
| | | | | 345/161 |
| 2015/0160779 | A1* | 6/2015 | Huang | G06F 3/0488 |
| | | | | 345/173 |
| 2015/0160794 | A1* | 6/2015 | Huang | G06F 3/04842 |
| | | | | 715/810 |
| 2015/0331548 | A1* | 11/2015 | Zhang | G06F 3/04842 |
| | | | | 715/771 |
| 2016/0026343 | A1* | 1/2016 | Finkenstadt | G06Q 30/0641 |
| | | | | 715/765 |
| 2017/0160922 | A1 | 6/2017 | Chiarini | |
| 2018/0181245 | A1* | 6/2018 | Beck | G06F 3/0418 |
| 2018/0335856 | A1* | 11/2018 | Wolters | G06F 1/1694 |
| 2019/0034075 | A1* | 1/2019 | Smochko | G06F 3/04842 |
| 2020/0081570 | A1* | 3/2020 | Suk | G06F 3/04886 |
| 2022/0035521 | A1* | 2/2022 | Smochko | G06F 3/03547 |

FOREIGN PATENT DOCUMENTS

| | | | |
|---|---|---|---|
| EP | 4002078 | A1 | 5/2022 |
| JP | 5211021 | B2 * | 6/2013 |

OTHER PUBLICATIONS

International Search Report (PCT/ISA/210) with translation and Written Opinion (PCT/ISA/237) with machine translation mailed on Oct. 23, 2023, by the European Patent Office as the International Searching Authority for Application No. PCT/EP2023/072016. (17 pages).

Preliminary Research Report with machine translation dated Mar. 22, 2023, by the French Patent Office in corresponding French Patent Application No. FR2208516. (14 pages).

* cited by examiner

500

505

504

METHOD AND DEVICE FOR CONTROLLING A TOUCH SCREEN

CROSS REFERENCE TO RELATED APPLICATIONS

This application is the U.S. National Phase Application of PCT International Application No. PCT/EP2023/072016, filed Aug. 9, 2023, which claims priority to French Patent Application No. 2208516, filed Aug. 25, 2022, the contents of such applications being incorporated by reference herein.

FIELD OF THE INVENTION

The invention concerns the field of touch screens and relates in particular to a method for improving the ergonomics of large touch screens.

BACKGROUND OF THE INVENTION

Touch interfaces are among the most common means of interaction on electronic devices. They can be found on mobile terminals such as smartphones, on gaming consoles, automated teller machines, automobile entertainment devices or on portable computers. Such interfaces are used to interact with these devices very intuitively by combining display and pointing functions.

A touch screen generally comprises a display, for example an OLED or LCD screen, above which is arranged a transparent detection surface that is used to determine the position of one or more points of contact on the screen. Thus, the position of a contact detected on the touch surface can be related to a particular graphical object displayed on the screen in order to trigger a functionality associated with that graphical object.

Today, there are two main touch screen technologies: resistive screens and capacitive screens.

Resistive screens are configured to detect pressure at a particular location. A resistive touch surface generally comprises 3 layers: a first flexible protective layer positioned above two layers of conductive materials. When pressure is applied to the screen, the conductive materials are compressed and an electrical contact is created between the two surfaces. This electrical contact is detected and interpreted by a device to determine the spot at which the pressure is exerted from a voltage measurement at the point of contact. This technology enables high accuracy in determining the coordinates of the point of contact.

Capacitive screens operate by touch, not by pressure. They comprise a glass panel crossed by an electrically charged conductive grid. When a conductive object, such as a finger or a suitable stylus, comes into contact with the glass panel, the electric field is changed at the location of the contact. The device determines the position of one or more points of contact by evaluating the changes in electric field using a mesh of electrodes.

As can be seen in FIG. 1A, a capacitive touch surface is constituted by sensors arranged in columns A, B, C on a first layer and in rows 1, 2, 3 on a second layer, so as to obtain a detection grid. Columns A, B, C shown in FIG. 1A are, for example, negatively charged so as to create an electric field at the points of intersection. When a contact is made with a conductive material such as a finger, the electric field is changed locally as shown in FIG. 1B. This change in electric field can be measured to determine the location of the contact. The measurements are performed by regularly scanning the columns one by one. Although the columns are crossed at a high frequency, this mechanism occasions a delay between the instant of the contact and the instant of its detection. This delay increases with the resolution of the detection grid and can become noticeable on very large touch screens. In the remainder of this description, the terms "touch resolution" will be used to denote the smallest difference in position that a touch surface is able to detect during a contact.

For example, whereas a classic touch panel with 80 rows and 40 columns offers a good compromise in terms of delay and accuracy when used on a smartphone, such a resolution may not be sufficient on a giant screen. Lack of accuracy can be responsible for pointing error and degrade the user experience. An equivalent problem arises if one chooses, for economic reasons, to use a touch panel of very low resolution on a screen of modest size.

FIG. 2A shows a touch screen adapted to display a graphical interface element at a particular location. For example, a button BT1 of dimensions (w, h) is displayed at coordinates (x, y). These coordinates are relative to the graphical resolution of the display.

FIG. 2A also shows a grid 200$a$ comprising 18 columns and 16 rows, which correspond to the mesh of sensors of the touch surface and form a plurality of cells, and whose resolution is that of the touch panel of the screen, each cell in the figure corresponding to a detection area. The touch screen in FIG. 2A is thus adapted to detect 18×16 different contact locations.

The screen in FIG. 2A is associated with a processor that is configured by program instructions to determine, when a contact is detected in a particular cell of the touch panel at a particular location, whether to activate the functionality associated with an action on the button BT1. In other words, the program is configured to detect a pointing action relating to the button BT1, this detection comprising a conversion of the coordinates of the point of contact detected by the touch panel into graphical coordinates, and a comparison of the coordinates of the point of contact with the position and dimensions of the button BT1. The reference 201$a$ denotes all the locations detectable by the touch panel that are associated with the button BT1. As can be seen in FIG. 2A, the difference in resolution between the touch panel and the display introduces inaccuracies in the definition of the detection area associated with the button BT1. In this example, we have chosen to associate a cell with the button BT1 when at least one pixel of the button is included in this cell, with the result that the effective detection area is larger than the button itself.

This inaccuracy becomes particularly problematic when the resolution of the touch panel becomes much lower than the graphical resolution of the display. FIG. 2B shows, for example, a screen similar to that in FIG. 2A, but in which the touch panel has a resolution that is twice as low as the panel in FIG. 2A. It can be seen that the touch area 201$b$ formed by the cells comprising at least one pixel of the button BT2 is much larger than the area 201$a$ referenced in FIG. 2A, even though the button BT2 is displayed at the same location with the same dimensions as the button BT1 of FIG. 2$a$. Consequently, the button BT2 can be selected by pointing to pixels that do not belong to the button BT2, for example by touching the screen at the location of the cells D2 to D5. In addition to the problem of inaccuracy when selecting the button BT2, having larger detection areas than the graphical objects poses a problem when multiple interactive objects are displayed at a short distance. For example, there is an ambiguity with regard to the button BT2 or BT3 that needs to be activated in the event of contact in one of the cells D2 to D5 shown in FIG. 2B because the cells D2 to D5 comprise at least one pixel of each of these buttons. To avoid this kind of situation, we can arbitrarily decide to associate a touch area with a single graphical element in the event of ambiguity, but this can also lead to confusion. For example, associating the cells D2 to D5 exclusively with the button BT2 limits the interaction area associated with the button BT3 to the point that pointing to the bottom of the button BT2 will be interpreted as pointing to the button BT3.

Thus, ergonomic problems arise when the resolution of the touch surface is much lower than the graphical resolution of the display.

There is therefore a need for a solution to improve the user experience when using a touch screen comprising a touch panel whose touch resolution is particularly low compared to the graphical resolution of the display.

SUMMARY OF THE INVENTION

To this end, a method is proposed for controlling a touch screen comprising a display adapted to display at least one graphical interface element with a first graphical resolution, and a touch surface comprising a plurality of detection areas forming a detection grid whose touch resolution is lower than the first resolution, the method being such that it comprises steps of:

determining a display position of a graphical interface element on the display such that the number of detection areas covered by said graphical interface element is minimal, displaying the graphical interface element at the determined position, and triggering a function associated with the graphical interface element when a contact is detected in a detection area covered by the graphical interface element.

The method thus improves the accuracy of a touch screen during pointing operations, especially when the resolution of the touch panel is substantially lower than the graphical resolution of the display. More precisely, calculating the position of an interactive object displayed on the screen so that the object occupies a minimum of detection areas limits the extent of the touch area around the graphical object. As a result, selection errors are reduced. The method is particularly advantageous when applied to large touch screens whose cost is meant to be controlled to the detriment of the accuracy of the touch panel, the difference between the touch resolution and the graphical resolution then being particularly great.

According to one particular embodiment, the method is such that the step of determining a position of a graphical interface element comprises determining a display position of said interface element such that at least one border of the interface element is aligned with a border of a detection area.

It is thus proposed that the position of a graphical element be adjusted so that at least one of its edges coincides with a boundary delimiting two adjacent detection areas. In this way, a pointing action performed near the graphical element is prevented from being interpreted as pointing at this element. This improves the user experience.

According to one particular embodiment, the method is such that the step of determining the position of a graphical interface element comprises determining a display position of the graphical interface element such that at least two consecutive edges of the graphical interface element are respectively aligned with at least two borders of a detection area.

Such an arrangement matches the graphical interface element to the mesh of detectors of the touch panel even better, so that ergonomics are improved.

According to one particular embodiment, the method is such that it further comprises the following steps:

determining at least one dimension of the graphical interface element such that the interface element covers an integer number of detection areas according to said dimension, resizing the graphical interface element according to the determined dimension.

It is thus proposed that a dimension of the graphical interface element be adapted to adjust it to the resolution of the touch panel. For example, the length or width of a button is adjusted to cover an integer number of detection areas. In other words, the dimension is adjusted to match the granularity of the touch surface, that is to say at least two opposite edges of the graphical interface element are aligned with the detection grid.

According to another aspect, a device is proposed for controlling a touch screen comprising a display adapted to display at least one graphical interface element with a first graphical resolution, and a touch surface comprising a plurality of detection areas forming a detection grid whose resolution is lower than the first resolution, the device further comprising a processor coupled to a memory that stores computer program instructions configured to perform the following steps:

determining a display position of a graphical interface element on the display such that the number of detection areas covered by said graphical interface element is minimal, displaying the graphical interface element at the determined position, and triggering a function associated with the graphical interface element when a contact is detected in a detection area covered by the graphical interface element.

According to one particular embodiment, the device is such that the program instructions stored in the memory are further configured to:

determine at least one dimension of the graphical interface element such that the interface element covers an integer number of detection areas according to said dimension, resize the graphical interface element according to the determined dimension.

An aspect of the invention also relates to a touch screen comprising a device as described above.

Finally, an aspect of the invention relates to an information medium comprising computer program instructions configured to perform the steps of a method for controlling a touch screen as described above when the instructions are executed by a processor.

The information medium may be a non-transient information medium such as a hard disk, a flash memory or an optical disk, for example.

The information medium may be any entity or device capable of storing instructions. For example, the medium may comprise a storage means, such as a ROM (Read only Memory), RAM (Random Access Memory), PROM (Programmable Read only Memory), EPROM (Erasable Programmable Read only Memory), a CD ROM or a magnetic recording means, for example a hard disk.

On the other hand, the information medium may be a transmissible medium such as an electrical or optical signal, which may be routed via an electrical or optical cable, by radio or by other means.

Alternatively, the information medium may be an integrated circuit that incorporates the program, the circuit being adapted to execute or to be used in the execution of the methods in question.

The various embodiments or features mentioned above may be added independently or in combination with each other to the steps of the control method.

The methods, devices, touch screens and information media have at least advantages similar to those conferred by the method to which they relate.

BRIEF DESCRIPTION OF THE FIGURES

Other features and advantages of aspects of the invention will become apparent on reading the description that follows. This is purely illustrative and must be read in conjunction with the appended drawings, in which.

DETAILED DESCRIPTION OF EXEMPLARY EMBODIMENTS

Figure 1A:
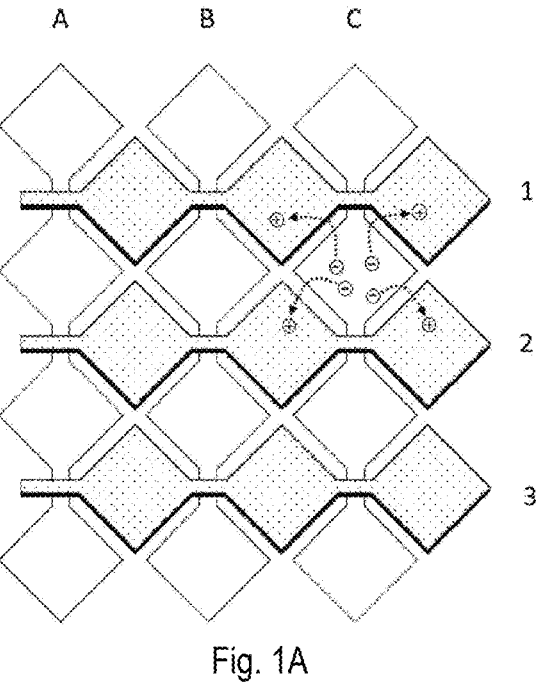
FIG. 1A shows an example of a mesh of electrodes of a capacitive touch screen in the absence of touch contact.
Figure 1B:
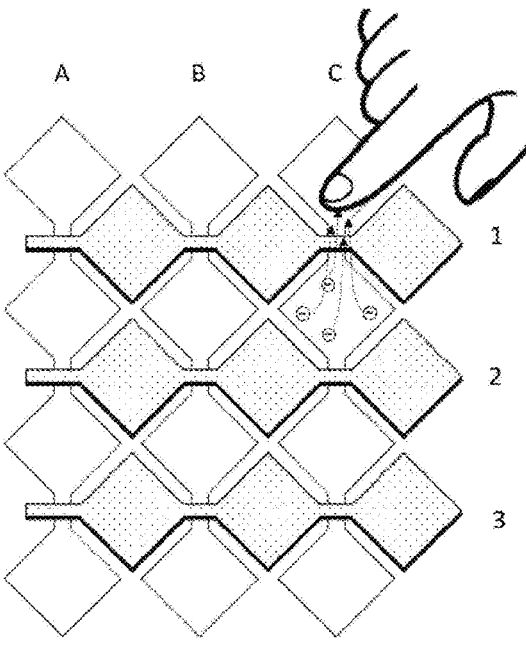
FIG. 1B shows an example of a mesh of electrodes of a capacitive touch screen during a touch contact.
Figure 2A:
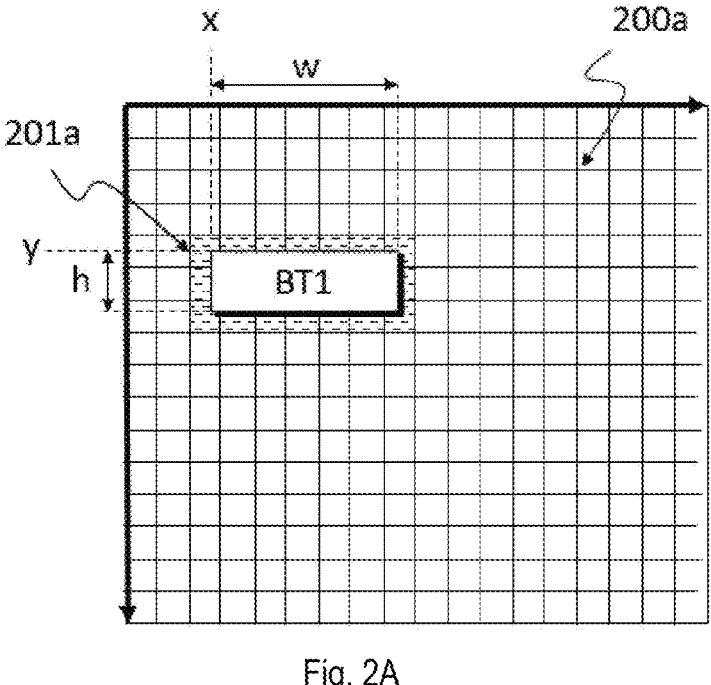
FIG. 2A shows a button displayed on a touch screen adapted to detect contacts with a first resolution.
Figure 2B:
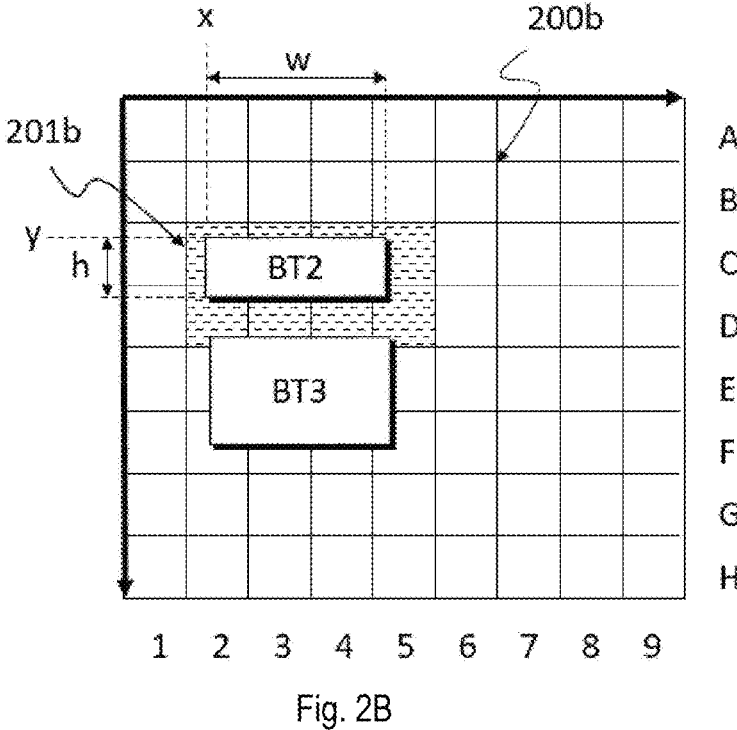
FIG. 2B shows two buttons displayed on a touch screen adapted to detect contacts with a second resolution.
Figure 3A:
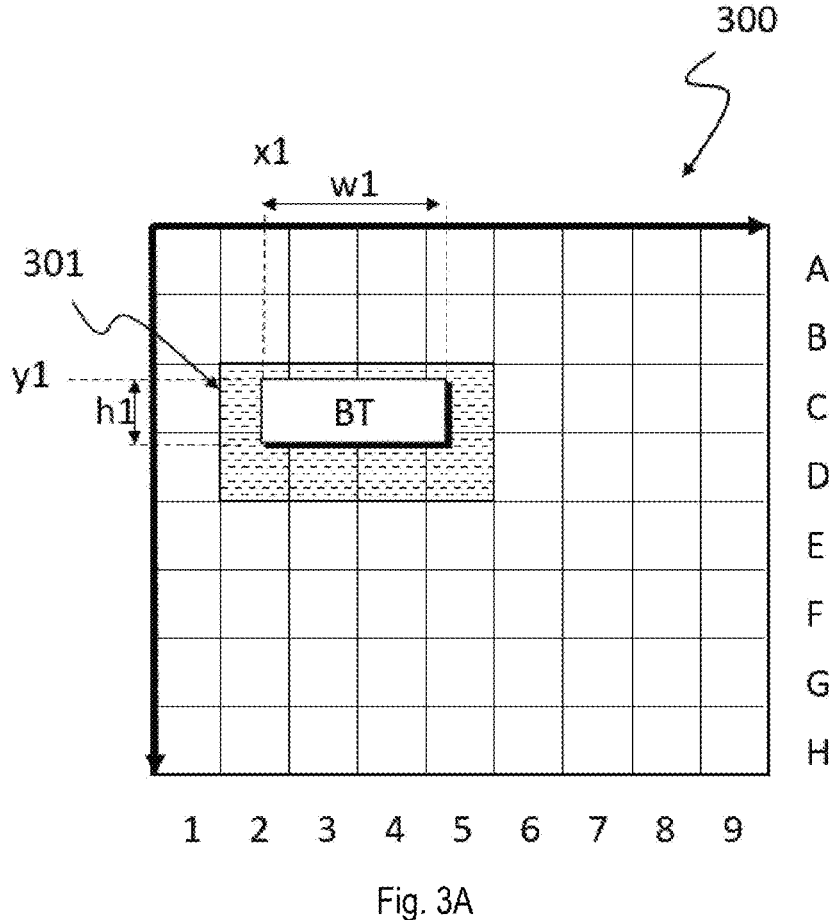
FIG. 3A shows a touch screen displaying a button at a first location.

FIG. 3A shows a touch screen 300 displaying a button BT. The screen 300 is, for example, integrated in a tablet, a computer, an automated teller machine, a gaming console or in an entertainment device for automobiles.

The touch screen comprises a display, for example an LCD or OLED screen, or else a cathode ray screen, and a transparent touch surface enabling a user to select a graphical object by touching the screen 300 at the location of the graphical object.

The display is adapted to display graphical objects with a particular graphical resolution. The screen 300 thus allows, for example, a button BT to be displayed at the coordinates $(x1, y1)$. The button BT is a graphical interface element of width w1 pixels and height h1 pixels that is configured to trigger a particular action when pointed at through the touch surface by the user. Various technologies can be used to implement the touch surface. For example, it may be a capacitive or resistive surface. Whatever the technology chosen, the touch surface has a particular touch resolution imposed by the mesh of detectors. Touch resolution is understood here to mean the smallest difference in position that a touch surface is able to detect during a contact. The term "detection area" will be used to denote a set of locations on the touch surface at which contacts are interpreted as having the same position due to the touch resolution. Typically, the touch resolution is lower than the graphical resolution. FIG. 3A shows a grid to realize the touch resolution of the screen 300. Thus, in this example, the resolution of the touch surface is much lower than the graphical resolution of the display. The cells defined by the grid represent detection areas within which it is not possible to distinguish different contact positions.

Because the resolution of the touch surface is different from the graphical resolution of the display, the touch screen 300 comprises a processing unit configured to convert the coordinates of a contact detected on the touch surface into display coordinates. In practice, when a contact is detected on the touch surface at a particular location, the processing unit associated with the screen 300 determines the pixel or pixels of the display that have been pointed at by the user. To do this, the processing unit obtains the resolution of the touch surface and the resolution of the display and calculates a ratio to determine a set of pixels corresponding to the detection area touched by the user. Thus, when, for example, a contact is detected on the screen 300 in the detection area D5, the processing unit determines that all pixels of the display included in the area D5 are selected.

Conventionally, the button BT, like all interactive graphical objects that are able to be displayed on such a screen, is associated with an activation region configured in such a way that the user's pointing in this region is interpreted as an action on the button and triggers an associated function. The activation region associated with the button BT is, for example, defined by the pixels that contribute to the graphical representation of this button. In other examples, such as in the case of hypertext links, the activation region can be defined independently of the pixels, for example by means of a rectangular area defined by coordinates.

As shown in FIG. 3A, the detection area D5 includes a portion of the button BT, so the user's pointing anywhere in the detection area D5 is interpreted as selection of the button BT. There is therefore a risk of an action by the user in one of the detection areas 301 being mistakenly interpreted as selection of the button BT.

In order to improve pointing accuracy, an aspect of the present invention proposes adjusting the position and dimensions of a graphical interface element so as to reduce the inaccuracy that results from the difference in resolution between the touch surface and the display.

A particular embodiment of a method for controlling a touch screen will now be described with reference to FIG. 4.

Figure 4:
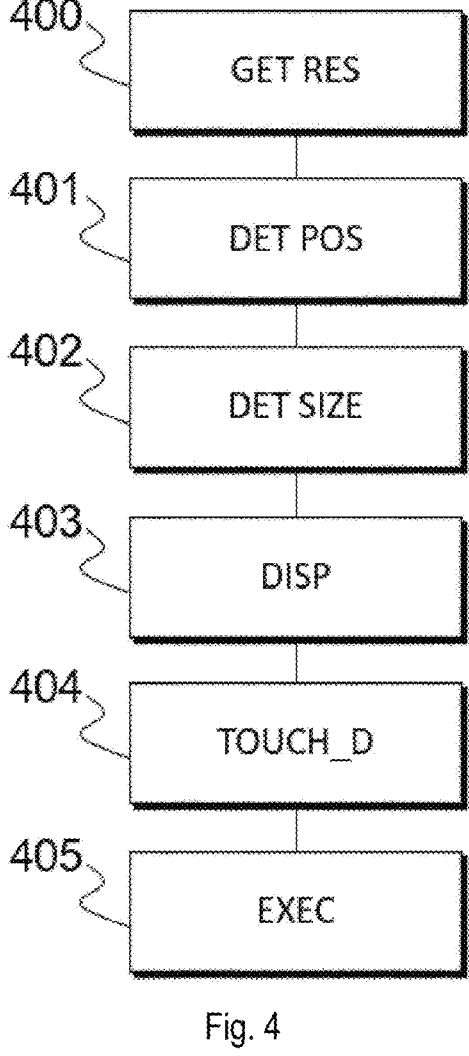
FIG. 4 is a flowchart showing the main steps of a control method according to a particular embodiment, FIG. 5 schematically shows the architecture of a device adapted to perform the control method according to a particular embodiment.

FIG. 4 is a flowchart illustrating the main steps of a method for controlling a touch screen according to a particular embodiment.

The method is, for example, performed by a control device comprising a processor coupled to a memory that stores computer program instructions adapted to perform the steps of the control method when they are executed by the processor.

During a first step 400, the device obtains the touch resolution of the touch surface and the graphical resolution of the display of a touch screen such as the screen 300 described above. For example, the resolution values are preconfigured in a ROM that the processor can access, in a configuration file of an operating system of a device in which the screen is integrated, or in a device driver software associated with the screen. From the resolutions thus obtained, the device calculates a ratio between the graphical resolution and the touch resolution in order to determine the dimensions, in pixels, of a touch detection area.

Figure 3B:
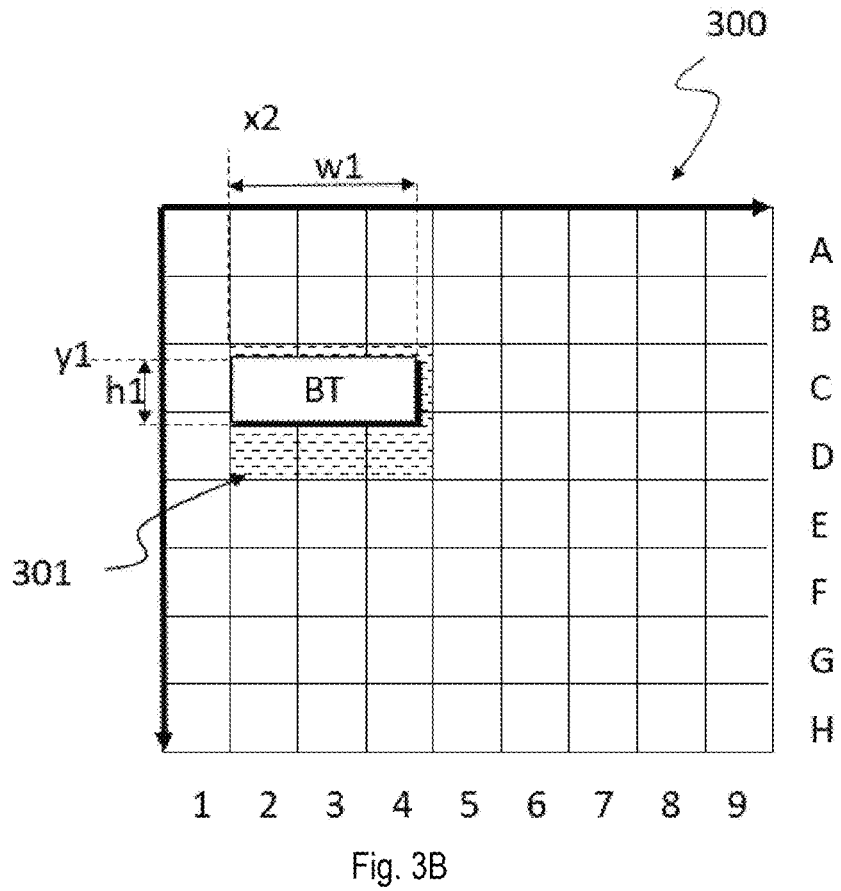
FIG. 3B shows a touch screen displaying a button repositioned according to a particular embodiment.

In step 401, the device determines a display position of a graphical interface element on the display such that the number of detection areas covered by said graphical interface element is minimal. To do this, the device obtains the position of a graphical interface element such as the button BT shown in FIG. 3A. The position of the button BT corresponds, for example, to the coordinates of the top left corner, but any other anchor point can be envisaged without modifying an aspect of the invention. Thus, the button BT shown in FIG. 3A is positioned at the graphical coordinates (x1, y1). The device then determines a new position of the button BT such that at least one border of the interface element is aligned with a border of a detection area. To do this, the device can calculate a quotient from the x-coordinate x1 of the button BT and the width, in pixels, of a touch detection area. In this way, the device can obtain a new x-coordinate of the button BT that is aligned with the mesh of the touch surface. FIG. 3B shows the screen 300 of FIG. 3A after the position of the button BT has been changed along the x-axis. The left edge of the button BT is then aligned with a detection area border of the touch surface. In this example, the horizontal movement of the button BT allows the number of detection areas 301 of the touch surface that are able to activate the button BT to be limited.

Figure 3C:
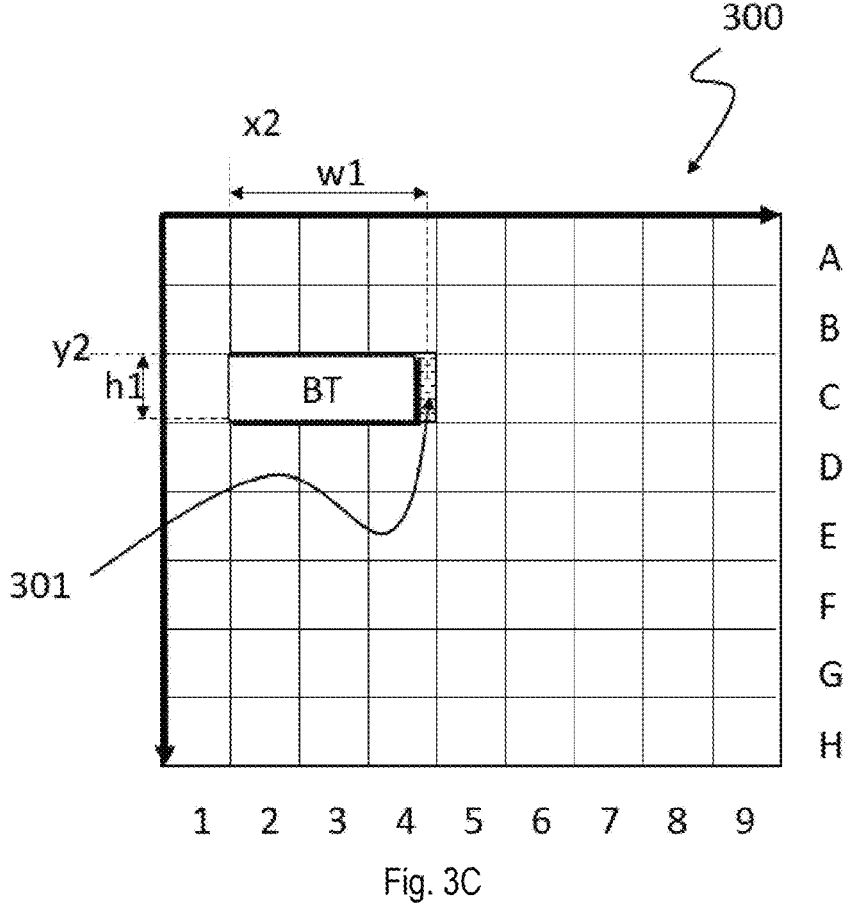
FIG. 3C shows a touch screen displaying a button repositioned according to a particular embodiment.

In one particular embodiment, the device calculates a quotient from the y-coordinate y1 of the button BT and the height, in pixels, of a touch detection area determined in step 400. In this way, the device can obtain a new y-coordinate of the button BT that is aligned with the mesh of the touch surface. FIG. 3C shows the screen 300 of FIG. 3B after the position of the button BT has been changed along the y-axis to y2. The top edge of the button BT is then aligned with a detection area border of the touch surface. In this example, the vertical movement of the button BT allows the number of detection areas 301 of the touch surface that are able to activate the button BT to be limited further.

Figure 3D:
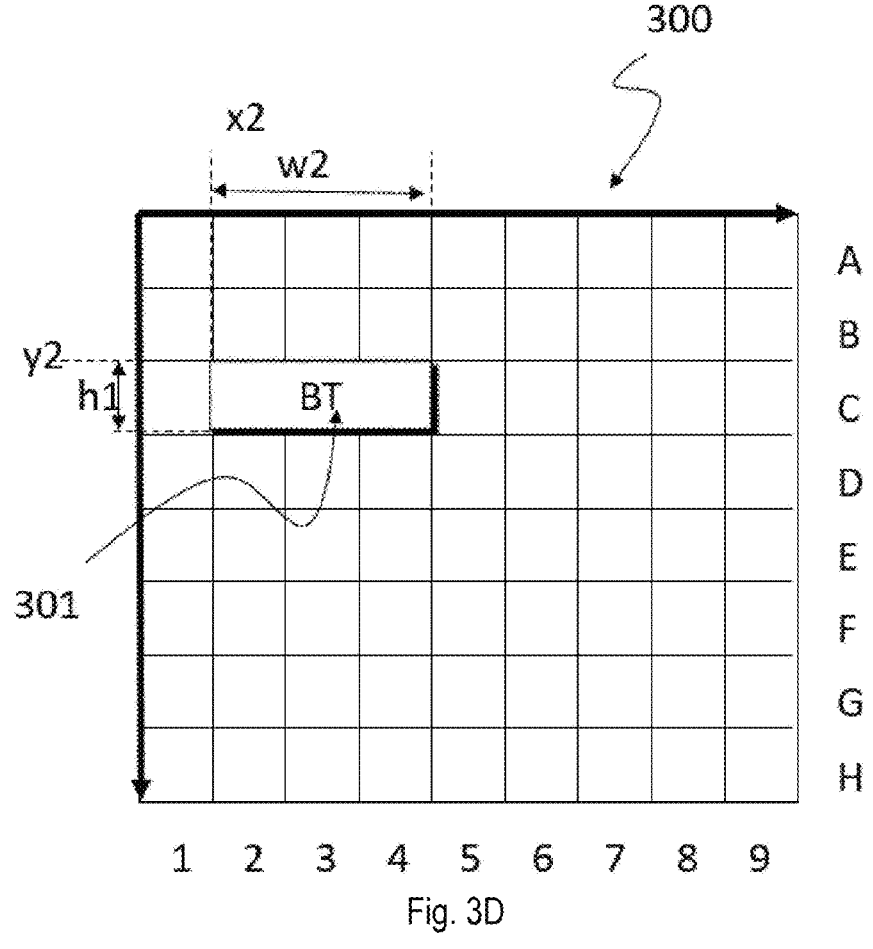
FIG. 3D shows a touch screen displaying a button resized according to a particular embodiment.

During an optional step 402, the device can adjust at least one dimension of the button BT, for example its width w1 and/or its height h1. More specifically, the device determines at least one dimension of the button BT such that an integer number of detection areas is covered by the interface element according to said at least one dimension. In other words, the height and/or width of the button BT is adjusted so that two opposite edges are aligned with a detection area boundary, preferably the nearest boundaries. FIG. 3D illustrates such a situation: the width w2 of the button BT of FIG. 3C is adjusted to align the right edge of the button BT with the boundary between the detection areas C4 and C5.

The method comprises a step 403 during which the graphical interface element BT is displayed on the display of the touch screen 300 according to the position and dimensions determined during steps 401 and 402. Thanks to the method that is performed, the number of detection areas covered by the button BT is optimal: whereas, at the initial location, shown in FIG. 3A, the button BT covers 8 detection areas of the touch surface, it occupies exactly 3 detection areas after repositioning and resizing. This improves pointing accuracy and the user experience.

The method finally comprises a step 404, during which the device detects the user's pointing to the button BT, that is to say a contact on the touch surface in a detection area that is covered by the graphical interface element BT, and triggers a function (Step 405) associated with the graphical interface element.

Figure 5:
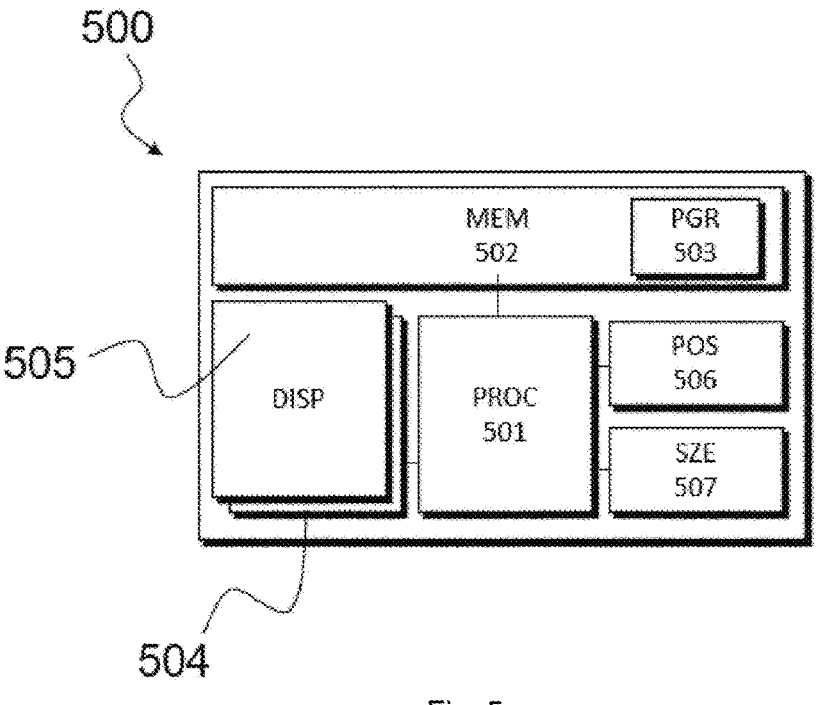

FIG. 5 shows the architecture of a control device 500 adapted to perform the method for controlling a touch screen according to a particular embodiment.

The device 500 comprises a storage space 502, for example a memory MEM, a processing unit 501 equipped, for example, with a processor PROC. The processing unit can be driven by a program 503, for example a computer program PGR, performing the control method described with reference to FIG. 4 and in particular the steps of determining a display position of a graphical interface element on the display such that the number of detection areas covered by said graphical interface element is minimal, displaying the graphical interface element at the determined position and triggering a function associated with the graphical interface element when a contact is detected in a detection area covered by the graphical interface element.

On initialization, the instructions of the computer program 503 are, for example, loaded into a RAM (Random Access Memory) before being executed by the processor of the processing unit 501. The processor of the processing unit 501 performs the steps of the control method according to the instructions of the computer program 503.

The device 500 comprises a display 504, for example an LCD or OLED screen, that is adapted to display graphical objects with a particular graphical resolution, above which is arranged a touch surface 505 adapted to determine coordinates of one or more locations pointed at by a user, using a finger or stylus, for example. The touch surface is, for example, a capacitive or resistive panel DSP comprising a mesh of detectors used to determine the position of a contact with a particular touch resolution, which is lower than the graphical resolution of the display 504, the mesh of sensors defining a plurality of contact detection areas. The touch surface 505 is superimposed on the screen 504 to form a touch screen from which a user can control the device 500.

The device 500 comprises a module 506 for repositioning a graphical interface element adapted to determine a display position of said graphical interface element on the display such that the number of contact detection areas covered by said graphical interface element is minimal. The module 506 can be implemented by computer program instructions POS that are configured to calculate a ratio between the resolution of the display 504 and the touch resolution of the touch surface 505 and to determine at least one position of the interface element such that the distance, in pixels, between an edge of the screen and an edge of the interface element is a multiple of the distance, in pixels, between the opposite edges of a detection area.

In one particular embodiment, the device 500 may also comprise a module 507 for resizing a graphical interface element adapted to determine at least one dimension of said graphical interface element on the display such that said graphical interface element covers an integer number of detection areas according to said dimension. The module 507 is, for example, implemented by program instructions SZE that are configured to enlarge or reduce a dimension of the interface element so that this dimension, in pixels, is a multiple of the dimension, in pixels, of a touch detection area.

The display 504 is also configured to display a graphical interface element at the position determined by the repositioning module 506, and according to the dimensions determined by the resizing module 507.

Finally, the computer program 503 comprises instructions that are configured to trigger the execution of a function associated with the graphical interface element when a contact is detected in a detection area covered by the repositioned and resized graphical interface element.

According to one particular embodiment, the device 500 is integrated in a tablet, a smartphone, a portable computer, a gaming console, a machine tool, an access controller, an automated teller machine or an entertainment device for automobiles.

The invention claimed is:

1. A method for controlling a touch screen comprising a display adapted to display a graphical interface element with a first graphical resolution, and a touch surface comprising a plurality of detection areas forming a detection grid whose touch resolution is lower than the first graphical resolution of the graphical interface element, the method comprising:

obtaining a first display position of the graphical interface element with the first graphical resolution on the display, determining a second display position of the graphical interface element with the first graphical resolution on the display such that a number of the plurality of detection areas covered by the graphical interface element is minimal, displaying the graphical interface element at the second determined display position, triggering a function associated with the graphical interface element when a contact is detected in a detection area covered by the graphical interface element in the second determined display position.

2. The method as claimed in claim 1, wherein the step of determining a position of the graphical interface element comprises determining a display position of the graphical interface element such that at least one border of the graphical interface element is aligned with a border of the detection area.

3. The method as claimed in claim 1, wherein the step of determining the position of the graphical interface element comprises determining a display position of the graphical interface element such that at least two consecutive edges of the graphical interface element are respectively aligned with at least two borders of the detection area.

4. The method as claimed in claim 1 further comprising:

determining at least one dimension of the graphical interface element such that the interface element covers an integer number of detection areas according to the determined at least one dimension, and resizing the graphical interface element according to the determined at least one dimension of the graphical interface element.

5. A non-transitory information medium comprising computer program instructions configured to perform the steps of a method for controlling a touch screen as claimed in claim 1 when the instructions are executed by a processor.

6. A device for controlling a touch screen comprising a display adapted to display a graphical interface element with a first graphical resolution, and a touch surface comprising a plurality of detection areas forming a detection grid whose resolution is lower than the first graphical resolution of the graphical interface element, the device further comprising a processor coupled to a memory that stores computer program instructions configured to perform:

obtaining a first display position of the graphical interface element with the first graphical resolution on the display, determining a second display position of the graphical interface element on the display such that a number of the plurality of detection areas covered by the graphical interface element is minimal, displaying the graphical interface element at the second determined display position, and triggering a function associated with the graphical interface element when a contact is detected in a detection area covered by the graphical interface element in the second determined display position.

7. A touch screen comprising the control device as claimed in claim 6.

* * * * *